May 13, 1958 J. I. WEILER 2,834,356
LIP LINER
Filed July 12, 1955
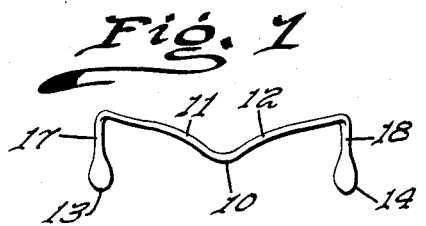
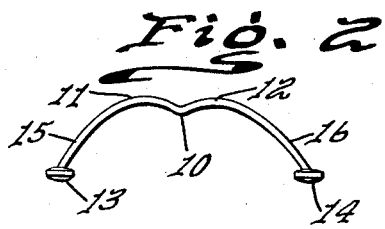
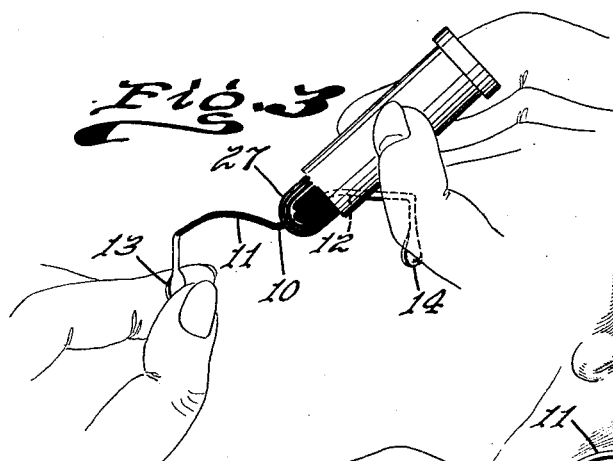
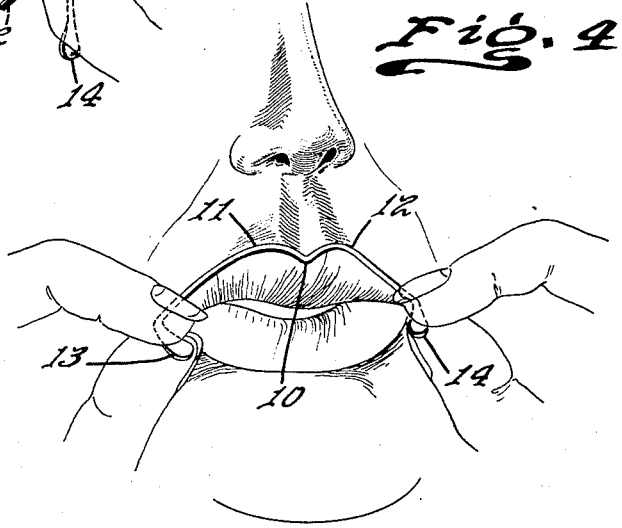
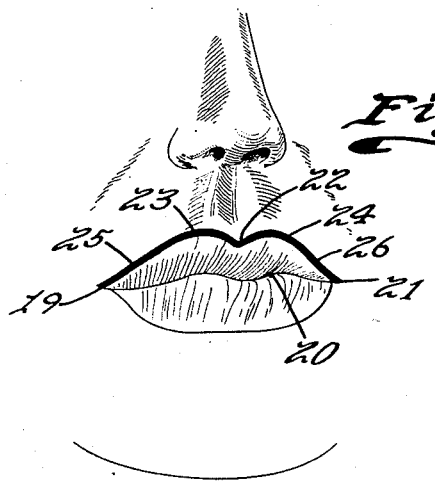
INVENTOR.
Jessie I. Weiler
BY Victor J. Evans & Co.
ATTORNEYS

United States Patent Office 2,834,356
Patented May 13, 1958

2,834,356

LIP LINER

Jessie I. Weiler, Los Angeles, Calif.

Application July 12, 1955, Serial No. 521,607

1 Claim. (Cl. 132—88.7)

This invention relates to cosmetics and particularly the application of lipstick to the lips, and in particular, a liner or guide patterned to correspond with the outline of the upper lip whereby with lip rouge applied to the inner surface of the liner an outline is applied to the upper lip by pressing the liner against the outer surface of the lip and the lip line, formed by the liner and extending from the center to the corners of the lip, is impressed upon the lower lip by rolling the upper lip with the line of rouge thereon over the lower lip and with the areas inside of the lip lines filled in substantially perfect upper and lower lips are obtained.

The purpose of this invention is to facilitate the application of lip rouge to lips of an indivdual whereby a substantally perfect lip line is immediately obtained.

Various types of devices have been provided for defining particularly the upper edge of lip rouge, however, where an attempt is made to hold a pattern or the like with one hand as the rouge is applied with the other it is substantially impossible to apply the rouge without smearing and with the upper edge on one side of the center corresponding with the upper edge on the opposite side. With this thought in mind, this invention contemplates a wire formed to correspond with the upper edge of lip rouge of an upper lip wherein with the rouge positioned on the device the outline of the area to be covered with rouge is readily obtained and wherein a corresponding line for the lower lip is obtained by rolling the lips together.

The object of this invention is, therefore, to provide a a lip liner or guide for determining the position of the top edge of lip rouge on an upper lip with the line duplicated on opposite sides of the center and without smearing.

Another object of the invention is to provide a guide or liner for providing a line indicating the upper edge of lip rouge of an upper lip in which both hands of an operator are free to apply the device to the lip.

Another important object of the invention is to provide a lip liner or guide in which lip rouge may be applied to the device and placed upon a lip by pressing the device against the surface of the lip.

A further object of the invention is to provide a lip liner or guide in which a balanced outline applied to the upper lip with the device is adapted to be used for placing a line on the lower lip with a rolling action of the lips.

A still further object of the invention is to provide an improved lip liner or guide in which the device is of a simple and economical construction.

With these and other objects and advantages in view, the invention embodies a wire patterned to correspond with the upper edge of an upper lip having a V-shaped depression in the center with arcuate upwardly extended and downwardly inclined side sections and with knobs extended from ends of said side sections.

Other features and advantages of the invention will appear from the following description, taken in connection with the drawing, wherein:

Figure 1 is a plan view of the improved lip liner.

Figure 2 is a front elevational view of the liner.

Figure 3 is a perspective view illustrating the use of the device by a woman, wherein the liner is held with one hand and lip rouge is applied to inner surface of the liner by lipstick held in the other hand.

Figure 4 is a front elevational view illustrating the use of the device by an individual wherein a liner with lip rouge applied to the rear surface is pressed against a lip with knobs at the end of the liner held in the hands of the individual.

Figure 5 is a view showing a line applied to the upper lip, the line having been formed by pressing the lip liner against the surface of the lip, as shown in Figure 4, or by painting a line on a lip with a brush, as shown in Figure 3.

Referring now to the drawing, wherein like reference characters denote corresponding parts, the improved lip liner of this invention includes a wire or strand of suitable material formed with a point or V 10 at the center, with arcuate upwardly extended sections 11 and 12 extended from the V and with knobs 13 and 14 extended from lower ends of arcuate downwardly inclined sections 15 and 16, respectively.

The liner or guide is provided in a plurality of sizes and, as illustrated in Figure 4, the sections 15 and 16 are positioned to extend to the corners at the sides of the mouth whereby a complete line is provided that extends from a corner of a mouth at one side of the center to a corner of the mouth at the opposite side. In order to obtain a neat appearing lip, it is necessary that the ends of the device extend to the outer corners of the mouth.

The knobs 13 and 14 are connected to the lower ends of the sections 15 and 16 with arms 17 and 18, as shown in Figure 1, and it will be understood that the arms may be long or short or of any suitable size.

With the lip liner formed, particularly as illustrated in Figures 2 and 4, a continuous line is adapted to be provided from one corner 19 of a mouth 20 to a corner 21 at the opposite side, the liner having a V-shaped depression 22 at the center with upwardly curved sections 23 and 24 extended from the V and with downwardly sloping sections 25 and 26 corresponding to the sections 15 and 16 of the liner and connecting the portions 23 and 24 to the corners 19 and 21.

The line is adapted to be formed by placing lip rouge on the inner surface of the wire or other strand of material and impressing the liner against the lip, as illustrated in Figure 4.

The lip liner of this invention may be formed of metal, plastic, or other suitable material.

With a line representing the upper edge of the upper lip positioned on the upper lip, the upper rouged lip is rolled over the lower lip whereby the line is positioned on the lower lip and the surface between the lines and inner portion of the mouth is readily covered with lip rouge providing substantially perfectly formed lips.

It will be understood that modifications, within the scope of the appended claim, may be made in the lip liner without departing from the spirit of the invention.

What is claimed is:

As a new article of manufacture, a lip liner patterned to correspond with the outline of a person's upper lip, said liner facilitating the application of lip rouge to lips of an individual whereby a substantially perfect lip line is readily obtained, said liner being made of wire-like material and shaped to include a V-shaped intermediate portion, said V-shaped portion terminating in arcuate upwardly extending sections which terminate in downwardly extending portions that are curved, knobs arranged contiguous to the lower ends of said last named portions, the longitudinal axes of said knobs being arranged in spaced parallel relation with respect to each other, said curved portions extending to the corners at the sides of the mouth, whereby a complete line is provided that extends from a corner of a mouth at one side of the center to a corner of the mouth at the opposite side, arms connecting said knobs to said curved portions, the longitudinal axes of the arms being arranged in spaced parallel relation with respect to each other, said arcuate sections, curved portions and arms being of substantially uniform cross-section, said knobs being flattened out and being of a size which is greater than the cross-section of the arcuate sections and curved portions, whereby a line is adapted to be formed by placing lip rouge on the inner surface of the liner and pressing the liner against the lip, and with a line representing the upper edge of the upper lip positioned on the upper lip, the upper rouged lip is rolled over the lower lip whereby the line is positioned on the lower lip and the surface between the lines and inner portion of the mouth is readily covered with lip rouge providing substantially perfectly formed lips.

References Cited in the file of this patent

UNITED STATES PATENTS

| | | |
|---|---|---|
| 1,526,028 | Volkman | Feb. 10, 1925 |
| 1,564,806 | Wieder | Dec. 8, 1925 |
| 1,944,691 | Libby | Jan. 23, 1934 |
| 2,416,029 | Turnes | Feb. 18, 1947 |
| 2,489,807 | Ostrow | Nov. 29, 1949 |
| 2,646,054 | Greene et al. | July 21, 1953 |